May 7, 1968 P. G. VINDEZ 3,381,579

BACK SPOT-FACING TOOL

Filed Jan. 14, 1966 2 Sheets-Sheet 1

INVENTOR.
PIERRE G. VINDEZ
BY
Mason & Graham
ATTORNEYS

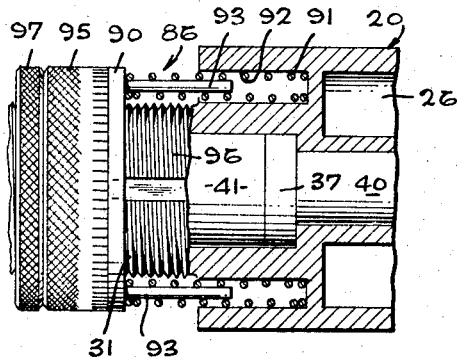
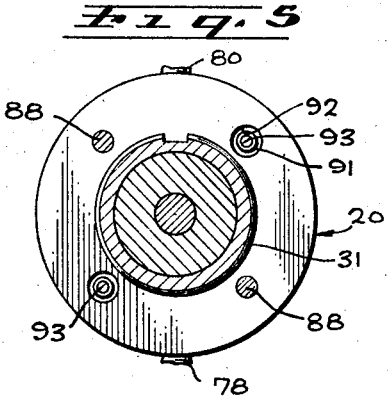
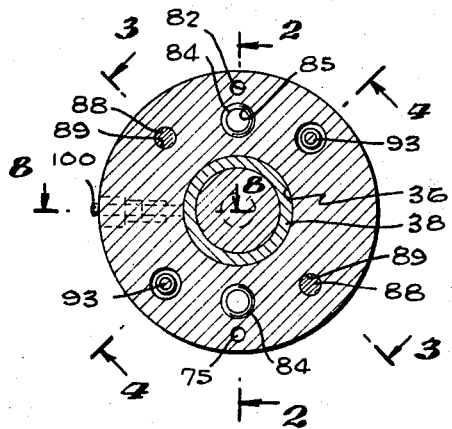
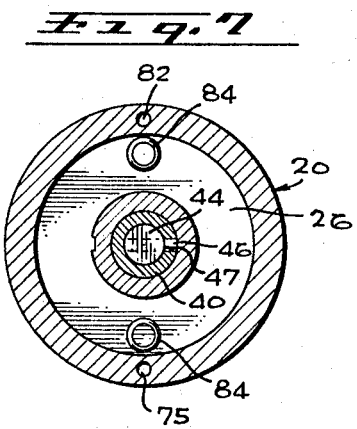
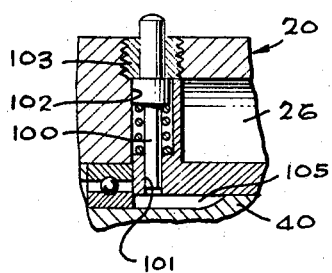

United States Patent Office 3,381,579
Patented May 7, 1968

3,381,579
BACK SPOT-FACING TOOL
Pierre G. Vindez, Redondo Beach, Calif., assignor to Zephyr Manufacturing Co., Inglewood, Calif., a copartnership
Filed Jan. 14, 1966, Ser. No. 520,628
7 Claims. (Cl. 90—12)

ABSTRACT OF THE DISCLOSURE

The application discloses a self-powered tool for spot-facing the far side of a workpiece including an axially movable motor-driven rotatable pilot shaft adapted to have a tool demountably secured to its outer end, a piston for retracting the shaft, a casing with an adjustable foot-piece to bear against the near side of the work, and an adjustable stop means for limiting the stroke of the piston.

---

This invention has to do generally with tools for performing spot-facing, countersinking and similar operations on the back or far side of a workpiece, such as a sheet or plate. More particularly the invention relates to tools having a motor-driven pilot shaft which is inserted through a hole in the work and to which a cutting tool is attached on the back or far side of the work to perform the facing or countersinking operation and such tools as include power means for feeding the cutter into the work.

An object of the invention is to provide a new and improved power-driven and power-operated tool for performing back spot-facing, countersinking and similar operations on the back or far side of a workpiece which can be readily controlled and easily handled. In this connection certain presently used devices are difficult to handle because the tool itself expands during the cutting operation or has exposed moving parts other than the pilot and cutter, and it is an object to provide a tool which does not have these shortcomings.

More particularly it is an object to provide an accurately adjustable tool which provides a powered feed stroke. In this connection it is an object to provide a tool which is so constructed that it can be seated against the work, the feed stroke adjustment made, and subsequently operated to perform the machining operation with the tool held in fixed position bearing against the face of the work.

Another object is to provide a novel tool of the type indicated which is adjustable over a wide range of workpiece thicknesses and of cutting depths.

Still another object is to provide a tool of the type indicated embodying a novel construction whereby the pilot and cutter can be readily replaced and rapidly changed.

These and other objects will be apparent from the drawings and the following description. Referring to the drawings:

FIG. 4 is a fragmentary longitudinal sectional view in the plane designated by line 4—4 of FIG. 6;

Figure 2:
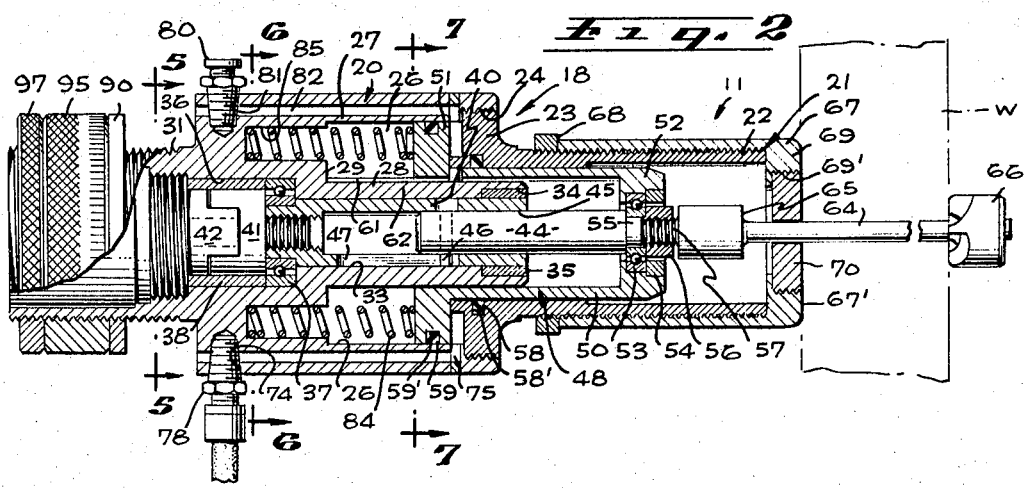
FIG. 2 is a central longitudinal sectional view through the tool of my invention, but on a larger scale.
Figure 3:
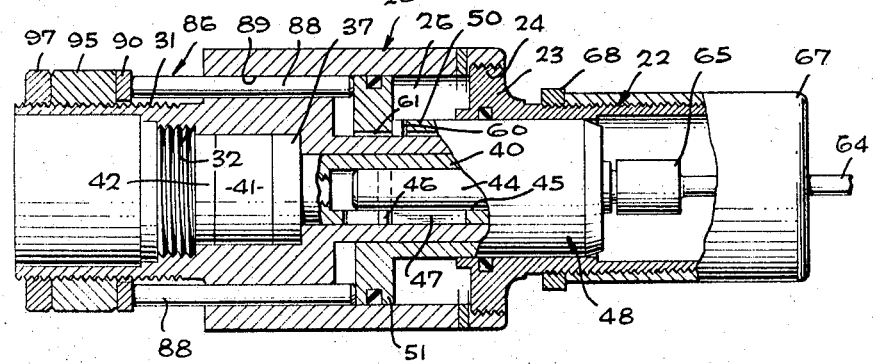
FIG. 3 is a longitudinal sectional view on the plane indicated by line 3—3 of FIG. 6.

FIGS. 5, 6 and 7 are cross-sectional views on lines 5—5, 6—6 and 7—7, respectively, of FIG. 2; and FIG. 8 is a fragmentary sectional view on line 8—8 of FIG. 6.

Figure 1:
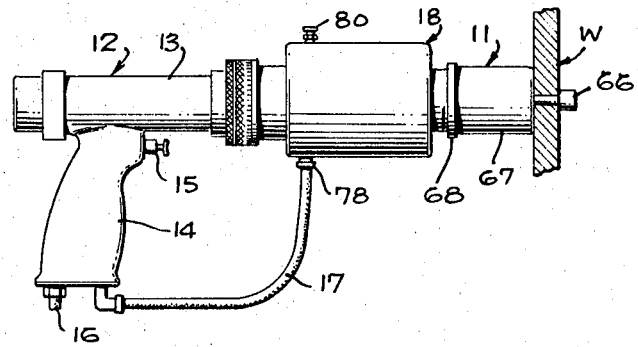
FIG. 1 is a side elevational view of a tool embodying the invention shown attached to a motor unit.

More particularly describing the invention, in FIG. 1 I show a tool embodying the invention which is generally designated by numeral 11 and this is shown attached to a motor unit 12. The latter houses an air-driven (or electric) motor (not shown) in the main section 13 and has a pistol grip-type handle 14 fitted with a trigger-like valve operating member 15 for controlling the motor. Assuming that the motor is air-driven, it is supplied with air under pressure from a suitable source by a hose 16 and a separate hose 17 supplies air under pressure to the tool 11. The member 15 operates suitable valves (not shown) to control air flow in a conventional manner.

Referring now to the tool 11, this comprises a generally cylindrical housing or casing 18 which includes a main section 20 and a forward section 21. The forward section includes an elongated externally threaded cylindrical section 22 and a relatively thick flange 23 at the inner end which is externally threaded to be received in a threaded counterbore 24 of the main section. The latter is provided with an annular chamber 26 defined by side walls 27 and 28 and an end wall 29, and by flange 23 of the forward section. The rear portion of the main section of the casing is radially reduced to provide an exteriorly threaded cylindrical section 31. This is counterbored and internally threaded at 32 to accommodate the forward end of the motor unit which is mounted therein.

The main section of the housing is further characterized by a main bore 33 and the inner end of this is counterbored at 34 to accommodate a bearing 35. Rearwardly of the main bore 33 is a counterbore 36 that accommodates a bearing 37 and a spacer 38. A drive sleeve 40 is journalled in the bearings 35 and 37 and this sleeve is fitted with a coupling or female tang 41 to accommodate a coupling element or male tang 42 on the end of the motor shaft of the motor unit. The drive sleeve is thus driven by the motor unit.

The drive sleeve receives the inner end portion of a drive shaft 44 which is axially movable in the bore 45 of the sleeve. The two parts are connected by a pin 46 mounted in the shaft and extending radially therefrom into an axial slot 47 in the wall of the sleeve.

The shaft is journalled at its outer end in a tubular piston 48. The piston includes a cylindrical body 50, a relatively thick flange 51 at its inner end which is received in the chamber 26 and a relatively thick internal flange 52 at its outer end. A bearing 53, mounted in flange 52 and retained by a threaded ring 54, serves to journal the shaft. The bearing seats on a portion 55 of the shaft which is of reduced diameter and is locked to the shaft by a retainer 56 on the threaded end portion 57 of the shaft. Seal rings 58 and 59 are provided in grooves 58' and 59', respectively. A pin 60 in the piston is received in an axial channel 61 in wall 62 of housing section 20 to prevent relative rotation of the parts.

A pilot or pilot shaft 64 with an internally threaded cup-like end portion 65 mounts on the threaded end 57 of the shaft. The pilot is adapted to be formed at its outer end in any suitable configuration for the quick attachment and detachment of a cutter 66, the cutter and the means of attachment being conventional and well known in the art.

The forward section of the casing accommodates a cylindrical, internally threaded footpiece 67 which is adjustable upon the threaded exterior of the casing section 22 and a lock ring 68 is provided for securing the footpiece in an adjusted position. The footpiece has an interior end flange 69 at its outer end and this has a threaded counterbore 69' that receives a bushing 70 of suitable material. The bushing can be replaced by another appropriate-sized bushing, depending upon the diameter of the pilot used.

In order to supply pressure fluid to the piston, I provide an inlet port 74 and this communicates with an inlet passage 75 leading to chamber 26 ahead of the piston. The pressure fluid, which may be compressed air, is supplied by the hose 17 having an appropriate fitting 78. The effective fluid pressure on the piston is controlled by means of an adjustable bleed valve 80 mounted in a port 81 which communicates with a passage 82 leading to the forward end of the chamber 26. Piston return springs 84 are provided in two bores 85.

The stroke of the piston is accurately controlled by a piston stop assembly 86. This comprises two stop pins 88 which are mounted in axially extending bores 89 leading into the chamber 26. These pins are mounted on a ring 90 that is urged outwardly by two springs 91 mounted in bores 92 in casing section 20. Guide pins 93 are also provided on ring 90. The position of the stop pins is determined by an indexing ring 95 which is internally threaded and mounted on the external threads 96 of the portion 31 of the housing. A lock ring 97 is provided behind this.

In the operation of the device, the correct size of cutting tool, pilot and bushing are first determined and these parts are assembled on the tool. The pilot is then inserted through the hole in the work W and the cutter mounted on the end thereof. The footpiece is then rotated until its end surface 67' lightly engages the forward surface of the work and the cutter engages the rear face thereof. The footpiece is locked in place by means of lock ring 68. The indexing ring 95 is then turned so that it brings the stop pins into engagement with the piston, after which, depending upon the depth of cut desired, the indexing ring is backed off the appropriate distance, thereby determining the stroke of the piston and thus the depth of cut to be made. Lock ring 97 is then set. The orifice opening of the bleed valve 80 is adjusted to provide the proper speed of feed. The tool is then ready to perform the desired machining operation.

I provide a lock pin 100 in a bore 101 and counterbore 102 and bushing 103 within the housing member 20. The pin is yieldably urged outwardly by a coil compression spring 104. When depressed, the inner end of the pin enters a groove 105 in the drive sleeve 40, to lock the same against rotation to facilitate changing of pilots.

Although I have shown and described preferred forms of my invention, I contemplate that various changes and modifications can be made therein without departing from the invention, the scope of which is indicated by the following claims.

I claim:
1. A back spot-facing and countersinking tool, comprising a tubular casing, a drive sleeve journalled for rotation in the casing and adapted to be driven by a motor, a drive shaft telescopically received in said sleeve, a drive connection between said sleeve and shaft preventing relative rotation thereof while permitting relative axial movement, a pilot mounted on the end of said shaft projecting beyond an end of the casing and adapted to carry a cutter at its outer end, an axially adjustable work-engaging footpiece at the working end of said casing, and means for moving said shaft axially.

2. The tool set forth in claim 1 in which piston means is provided in the casing for moving said shaft axially and in which an adjustable stop means is provided for limiting the stroke of said piston means.

3. A back spot-facing and countersinking tool, comprising a tubular casing, a drive sleeve journalled for rotation in the casing and adapted to be driven by a motor, a drive shaft telescopically received in said sleeve, a drive connection between said sleeve and shaft preventing relative rotation thereof while permitting relative axial movement, a pilot mounted on the end of said shaft projecting beyond an end of the casing and adapted to carry a cutter at its outer end, said casing being formed to provide an annular chamber concentric with said sleeve, an annular piston in said chamber, said casing having fluid inlet and outlet passage means from the exterior thereof to said chamber, said piston having an extension projecting forward beyond the end of said sleeve and journalling said shaft.

4. The tool set forth in claim 3 in which said casing carries an adjustable stop means for limiting the stroke of the piston.

5. The tool set forth in claim 3 in which said casing carries an adjustable stop means for limiting the stroke of the piston and in which said casing is provided with an axially adjustable work-engaging footpiece at the working end thereof.

6. A back spot-facing and countersinking tool, comprising a tubular casing, a drive sleeve journalled for rotation in the casing and adapted to be driven by a motor, a drive shaft telescopically received in said sleeve, a drive connection between said sleeve and shaft preventing relative rotation thereof while permitting relative axial movement, a pilot mounted on the end of said shaft projecting beyond an end of the casing and adapted to carry a cutter at its outer end, piston means within the casing for moving said shaft axially, and an adjustable stop means mounted in the casing for limiting the stroke of said piston means.

7. The tool set forth in claim 2 in which said adjustable stop means comprises stop pins mounted for axial movement in the casing and having their inner ends in the path of movement of the piston, and an indexing ring assembly threadedly adjustable on the exterior of the casing at the outer ends of said stop pins.

References Cited
FOREIGN PATENTS
933,120  9/1955  Germany.

FRANCIS S. HUSAR, *Primary Examiner.*